United States Patent Office 3,479,132
Patented Nov. 18, 1969

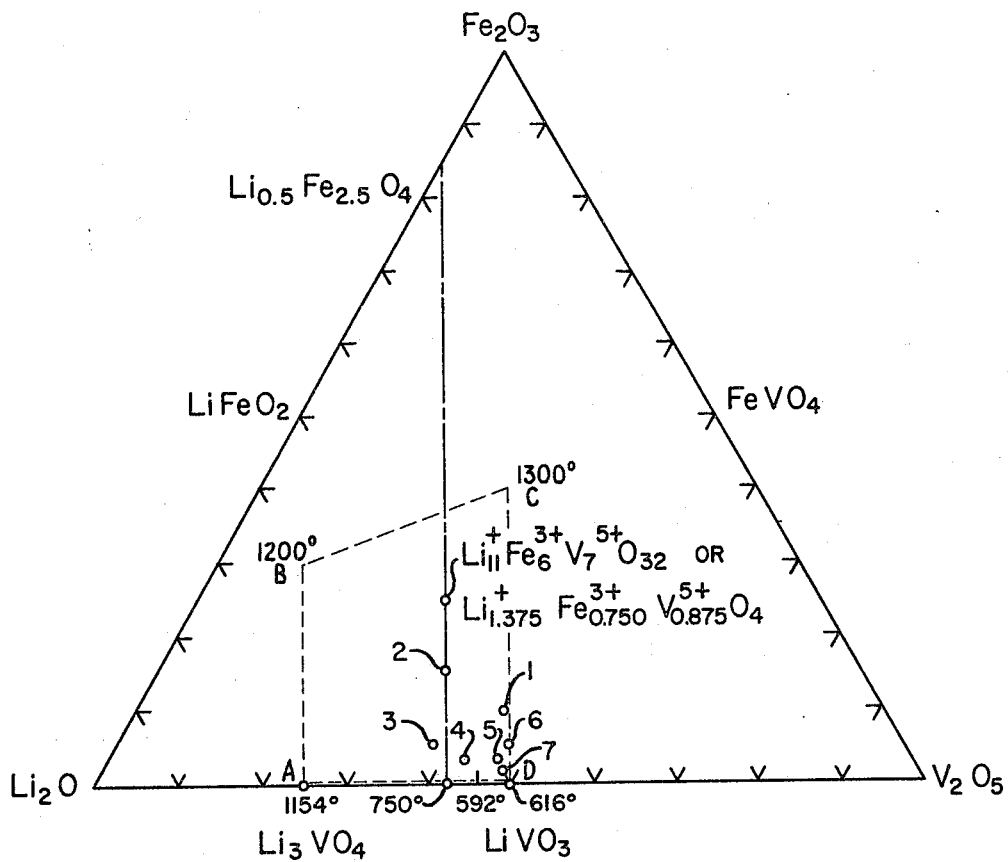

3,479,132
TRANSPARENT MAGNETIC SPINEL CRYSTAL OF MIXED OXIDE OF LITHIUM IRON AND VANADIUM
Donald G. Wickham, Malibu, Calif., assignor to Ampex Corporation, Redwood City, Calif., a corporation of California
Filed Aug. 10, 1967, Ser. No. 659,743
Int. Cl. C01d *11/02;* C01g *31/00*
U.S. Cl. 23—51    4 Claims

ABSTRACT OF THE DISCLOSURE

A transparent magnetic compound having a spinel crystal structure and the formula $Li_{11}Fe_6V_7O_{32}$ is described. It is prepared by mixing lithium carbonate, iron oxide and vanadium pentoxide, heating the mixture to at least 800° C. and cooling the resulting melt at a rate of at least 200° C. per hour. Soluble impurities are extracted with water leaving the orange colored compound.

BACKGROUND OF THE INVENTION

Field of the invention

Ferrite containing vanadium and lithium.

Description of the prior art

The combination of a transparent magnetic material is not common; most ferromagnetic or ferrimagnetic substances are opaque, in contrast with the novel spinel of the present invention. This material has several practical applications based upon the Faraday effect, i.e., the rotation of the plane of polarized light as the light passes through the crystal along the axis of magnetization. One such application is the modulation of a transmitted light beam by applied magnetic fields.

SUMMARY OF THE INVENTION

A transparent magnetic spinel crystal structure is provided having the formula $Li^+{}_{11}Fe^{3+}{}_6V^{5+}{}_7O^{2-}{}_{32}$ or $Li_{11}Fe_6V_7O_{32}$.

DESCRIPTION OF THE PREFERRED EMBODIMENTS

In order to carry out the present invention, lithium carbonate, iron oxide and vanadium pentoxide are mixed together and heated in a platinum crucible to approximately 800° C. A melt is obtained which is held at this temperature for several hours, suitably four hours and then cooled at the rate of 200° C. per hour or faster. As the temperature falls below the solidification temperature of lithium metavanadate, $LiVO_3$, which is about 600° C., a few seed crystals of this substance are dropped into the melt. The crystallization of $LiVO_3$ begins and continues as the cooling proceeds while the melt becomes enriched in iron. Eventually complete solidification occurs and when the crucible and its contents have cooled to about 400° C. they are removed from the furnace. The contents of the crucible consist primarily of lithium metavanadate and the spinel compound of the present invention, namely, $Li_{11}Fe_6V_7O_{32}$. Lithium vanadates are extracted with water, leaving a residue of the insoluble, orange-colored, magnetic spinel.

If the melt is cooled very rapidly, the crystals of the spinel obtained are poorly crystallized and sometimes non-magnetic. The crystallinity and magnetization are rapidly increased by annealing the crystals for several hours at a temperature between 400 and 500° C. The color becomes a deeper orange at the same time.

Various compositions can be used in the melt to produce the novel spinel of the present invention. Lithium carbonate is used as the lithium source. This starting material gives up its carbon dioxide as it combines with the other materials and thus the compositions can all be represented as oxides only. Suitable composition which can be used in carrying out the present invention are plotted on the drawing which forms part of this patent application.

The various compositions which can be used are those enclosed by the line ABCD in the figure. The points ABCD are specified in molar proportions as $Li_2O$:
A ------------------------------------ 0.7495
B ------------------------------------ 0.6
C ------------------------------------ 0.3
D ------------------------------------ 0.4995

$Fe_2O_3$:
A ------------------------------------ 0.0010
B ------------------------------------ 0.3
C ------------------------------------ 0.4
D ------------------------------------ 0.0010

$V_2O_5$:
A ------------------------------------ 0.2495
B ------------------------------------ 0.1
C ------------------------------------ 0.3
D ------------------------------------ 0.4995

The formulas of some previously known compounds are written along the sides of the diagram for information and the melting points of several compositions between $Li_2O$ and $V_2O_5$ are listed including the eutectic point between $Li_3VO_4$ and $LiVO_3$ at 592° C. The preferred melt composition is indicated at point 7 in the diagram and is the composition set forth in Example I below. However, it has been stated above, other melt compositions can be used such as those indicated by points 1, 2, 3, 4, 5, and 6 of the diagram, all of which fall within the dash line and yield the orange spinel in various amounts but always mixed with crystals of alpha-$Fe_2O_3$ which is also water insoluble. Dilute nitric acid will dissolve the spinel leaving undissolved the alpha-$Fe_2O_3$ and the procedure can be used to prepare crystals of this substance instead of the spinel. The spinel can be separated from most of the alpha-ferric oxide by sieving because the alpha ferric oxide crystals are much larger than those of the spinel. Melt compositions between point 7 and $Li_3VO_4$ also can be used. In these cases the solids obtained after cooling the melt contain $Li_3VO_4$ which, although soluble in water at equilibrium, dissolves very slowly making recovery of the spinel very time consuming. The temperature necessary to obtain a completely molten sample varies with the composition. These temperatures are indicated in the drawing. Higher temperatures are not detrimental to the procedure unless they are so high as to cause a substantial change in composition due to the evaporation of lithium oxide. A soak period of 4 hours has been used satisfactorily when temperatures about 200° C. above the melting points were chosen as the soak temperatures. The spinel obtained from the melts of compositions include in the area ABCD always has the same composition, $Li_{11}Fe_6V_7O_{32}$.

The following non-limiting examples illustrate preferred embodiments of the invention.

Example I

Lithium carbonate, iron oxide and vanadium pentoxide were mixed together in the molar proportions 0.50:0.015:0.485. The mixture was placed in a platinum crucible and heated in a small electric furnace to approximately 800° C. A melt was obtained which is held at this temperature for four hours and then cooled at a rate of 200° C. per hour. As the temperature falls below the solidification temperature of lithium metavanadate, $LiVO_3$, which is about 600° C., a few seed crystals of this substance were dropped into the melt. The crystallization of $LiVO_3$ begins and continues as the cooling proceeds while the melt becomes enriched in iron. Eventually complete solidification occurs and when the crucible and its contents have cooled to about 400° C. they are removed from the furnace. The contents of the crucible consist of chiefly lithium metavanadate and the new spinel compound, $Li_{11}Fe_6V_7O_{32}$. The lithium vanadates are extracted with water leaving a residue of the pure insoluble, orange-colored, magnetic spinel. The identity of the spinel crystals has been established by X-ray diffraction and chemical analysis. The cubic lattice constant $a_0$ is 8.258A. and the composition is that given by the formula above.

Example II

Lithium carbonate, iron oxide and vanadium pentoxide are mixed together in the molar proportions 0.50:0.15:0.485. The mixture is placed in a platinum crucible and heated to 800° C. A melt is obtained which is held at this temperature for 4 hours. The crucible is removed from the furnace and cooled within a period of 10 minutes to room temperature. The contents of the crucible consist of chiefly lithium metavanadate and the new spinel compound $Li_{11}Fe_6V_7O_{32}$. The lithium vanadates are extracted with water leaving a residue of the insoluble, finely divided, non-magnetic yellowish spinel. The dried powdered spinel is heated for 4 hours at 450° C. After this treatment larger, more deeply colored crystals are present which now possess a magnetic moment.

Example III

Lithium carbonate, iron oxide, and vanadium pentoxide are mixed together in the molar proportions 0.46:0.10:0.44. The mixture is placed in a platinum crucible and heated to 1050° C. and held at this temperature for 4 hours. The furnace is cooled at a rate of 14° C. per hour with the aid of an automatic temperature programming device. The crucible is removed from the furnace when the temperature reaches 400° C. The lithium metavanadate present is extracted with water leaving a residue of the spinel $Li_{11}Fe_6V_7O_{32}$ and large crystals of $\alpha$-$Fe_2O_3$. This residue can be treated in either of two ways. Dilute nitric acid will dissolve the spinel leaving a residue of pure $\alpha$-$Fe_2O_3$ crystals. The mixture of spinel and $\alpha$-$Fe_2O_3$ can be separated by shaking it on a 100-mesh sieve, most of the $\alpha$-$Fe_2O_3$ being retained on top, the more finely crystalline spinel passing through.

Example IV

Lithium carbonate, iron oxide and vanadium pentoxide are mixed together in the molar proportions 0.57:0.05:0.38. The mixture is heated to a temperature of 900° C. and held at this temperature for 4 hours. The sample then is cooled at a rate of 200° C./hour and when cool extracted with water. The sample is composed of the spinel $Li_{11}Fe_6V_7O_{32}$, $\alpha$-$Fe_2O_3$, lithium metavanadate, $LiVO_3$ and lithium orthovanadate, $Li_3VO_4$. The lithium metavanadate is readily dissolved away with water. Lithium orthovanadate dissolves very slowly. The final residue contains the spinel and $\alpha$-$Fe_2O_3$ which may be treated as in Example III.

I claim:
1. A novel weakly magnetic transparent spinel crystal of the formula: $Li_{11}Fe_6V_7O_{32}$.
2. The process for making the spinel crystal of claim 1 comprising the steps of:
   (a) preparing a melt of lithium carbonate, iron oxide and vanadium pentoxide in the molar proportions defined by the dash lines connecting points A, B, C and D of the drawing which points are defined as follows—

$Li_2O$:
| | |
|---|---|
| A | 0.7495 |
| B | 0.6 |
| C | 0.3 |
| D | 0.4995 |

$Fe_2O_3$:
| | |
|---|---|
| A | 0.0010 |
| B | 0.3 |
| C | 0.4 |
| D | 0.0010 |

$V_2O_5$:
| | |
|---|---|
| A | 0.2495 |
| B | 0.1 |
| C | 0.3 |
| D | 0.4995 |

(b) heating said melt to a temperature of at least 800° C. and maintaining said temperature for several hours,
   (c) cooling said melt at a rate of at least 200° C. per hour, and
   (d) extracting said melt with water to remove therefrom lithium metavanadate leaving a residue of the insoluble orange colored magnetic spinel having the formula: $Li_{11}Fe_6V_7O_{32}$.
3. The process of claim 2 to wherein seed crystals of $LiVO_3$ are added to the melt when it has cooled to about 600° C.
4. The process of claim 2 wherein the spinel is annealed at a temperature of from 400° C. to 500° C.

References Cited

UNITED STATES PATENTS 3,372,122  3/1968  Lessoff _____ 252—62.61

OTHER REFERENCES

Bernier et al., "Comptes Rendus," vol. 253, October 1961, p. 1578.

Blasse, "Journal of Inorganic and Nuclear Chemistry," vol. 25, 1963, pp. 136–137.

HERBERT T. CARTER, Primary Examiner

U.S. Cl. X.R.

23—20, 22; 252—62.61